US011174173B2

(12) United States Patent
Benz et al.

(10) Patent No.: US 11,174,173 B2
(45) Date of Patent: Nov. 16, 2021

(54) WATER PURIFICATION DEVICE

(71) Applicants: Benz Research and Development Corp., Sarasota, FL (US); Savannah Abbey Benz, Santa Barbara, CA (US); Patrick H. Benz, Santa Barbara, CA (US)

(72) Inventors: Savannah Abbey Benz, Santa Barbara, CA (US); Patrick H. Benz, Santa Barbara, CA (US)

(73) Assignee: Benz Research and Development Corp., Sarasota, FL (US)

( * ) Notice: Subject to any disclaimer, the term of this patent is extended or adjusted under 35 U.S.C. 154(b) by 0 days.

(21) Appl. No.: 15/951,962

(22) Filed: Apr. 12, 2018

(65) Prior Publication Data

US 2018/0305222 A1 Oct. 25, 2018

Related U.S. Application Data

(60) Provisional application No. 62/485,185, filed on Apr. 13, 2017.

(51) Int. Cl.
*B01D 1/00* (2006.01)
*B01D 5/00* (2006.01)
(Continued)

(52) U.S. Cl.
CPC ............ *C02F 1/048* (2013.01); *B01D 1/0017* (2013.01); *B01D 1/0082* (2013.01); *B01D 1/30* (2013.01);
(Continued)

(58) Field of Classification Search
CPC ...... B01D 1/0017; B01D 1/305; B01D 3/007; B01D 5/0057; B01D 5/006; B01D 1/26;
(Continued)

(56) References Cited

U.S. PATENT DOCUMENTS

| 587,162 A | * | 7/1897 | Rosebrook | ............... C02F 1/04 202/193 |
| 1,538,254 A | * | 5/1925 | Mellott | .................. B01D 1/227 159/6.1 |

(Continued)

FOREIGN PATENT DOCUMENTS

| CN | 104192928 A | 12/2014 |
| FR | 1231811 A | 10/1960 |

(Continued)

OTHER PUBLICATIONS

International Search Report and Written Opinion dated Jul. 3, 2018 in related International Appl. No. PCT/US2018/027334 (11 pgs.).

(Continued)

*Primary Examiner* — Jonathan Luke Pilcher
(74) *Attorney, Agent, or Firm* — Foley & Lardner LLP

(57) ABSTRACT

The disclosure provides systems methods and apparatus for purifying water. A purification device includes a heating vessel adapted to receive impure water and output water or water vapor. The device further includes at least one heating element arranged outside and in thermal contact with the heating vessel, configured to provide heat to the impure water. The device also includes at least one heat exchanger to exchange heat between the impure water and the water vapor to raise the temperature of the impure water. In some example implementations, the at least one heating element can include a Peltier cell.

17 Claims, 18 Drawing Sheets

(51) Int. Cl.
  *C02F 1/04*   (2006.01)
  *B01D 1/30*   (2006.01)
  *C02F 103/08*   (2006.01)
(52) U.S. Cl.
  CPC ............. *B01D 1/305* (2013.01); *B01D 5/006* (2013.01); *B01D 5/0039* (2013.01); *B01D 5/0042* (2013.01); *C02F 1/04* (2013.01); *C02F 1/042* (2013.01); *C02F 2103/08* (2013.01); *C02F 2303/10* (2013.01); *Y02W 10/37* (2015.05)
(58) Field of Classification Search
  CPC ................. B01D 1/2828; B01D 1/227; B01D 1/28–2896; B01D 1/30; B01D 5/0042; C02F 1/02; C02F 1/04–18; F24D 17/0005; F24D 17/0063; F24D 17/0089; F24D 17/02
  USPC .................................................. 202/191, 192
  See application file for complete search history.

(56) References Cited

U.S. PATENT DOCUMENTS

| | | | | |
|---|---|---|---|---|
| 1,595,666 | A * | 8/1926 | Knapp | B01D 1/30 |
| | | | | 196/122 |
| 2,554,546 | A * | 5/1951 | Zahm | B01D 1/227 |
| | | | | 15/246.5 |
| 2,971,897 | A | 2/1961 | Chapman | |
| 3,212,999 | A | 10/1965 | Sommers, Jr. | |
| 3,506,543 | A * | 4/1970 | Cross | C02F 1/18 |
| | | | | 203/10 |
| 4,249,989 | A * | 2/1981 | Kalmykov | B01D 1/227 |
| | | | | 159/10 |
| 4,276,124 | A * | 6/1981 | Mock | B01D 1/26 |
| | | | | 202/236 |
| 5,441,606 | A * | 8/1995 | Schlesinger | B01D 1/0017 |
| | | | | 202/176 |
| 5,968,321 | A * | 10/1999 | Sears | B01D 1/221 |
| | | | | 202/172 |
| 6,375,805 | B1 | 4/2002 | Dableh | |
| 6,805,774 | B2 * | 10/2004 | Dableh | B01D 1/0017 |
| | | | | 159/24.2 |
| 6,893,540 | B2 * | 5/2005 | Stout | B01D 1/0017 |
| | | | | 136/201 |
| 8,845,865 | B2 * | 9/2014 | Batty | B01D 1/2818 |
| | | | | 203/21 |
| 10,350,508 | B2 * | 7/2019 | Campbell | B01D 1/28 |
| 2002/0130029 | A1 * | 9/2002 | Stout | B01D 1/0017 |
| | | | | 203/10 |
| 2005/0115878 | A1 * | 6/2005 | Lai | C02F 1/04 |
| | | | | 210/175 |
| 2011/0000777 | A1 * | 1/2011 | Zhou | B01D 1/0041 |
| | | | | 202/180 |
| 2013/0186741 | A1 * | 7/2013 | Batty | B01D 1/2818 |
| | | | | 203/24 |
| 2016/0271514 | A1 * | 9/2016 | Campbell | B01D 1/2856 |

FOREIGN PATENT DOCUMENTS

| | | |
|---|---|---|
| GB | 0 855 458 A | 11/1960 |
| WO | WO-2009/138818 A1 | 11/2009 |
| WO | WO-2018/191517 A1 | 10/2018 |

OTHER PUBLICATIONS

International Search Report dated Apr. 3, 2020 in related International Appl. No. PCT/US2019/066293 (11 pgs.).

* cited by examiner

| TIME | WATER T | PELTIER P/S | | HEAT SINK T | | RIGHT SIDE OUTLET | TOP OF VESSEL T | NOTES: TEST DURATION 45 MINUTES, WATER LEVEL TO 7.25" |
|---|---|---|---|---|---|---|---|---|
| | DEG C | VOLTS | AMPS | LEFT | RIGHT | | DEG C | STARTED HEATING VESSEL AT 1025EST |
| 1100 | | | | | | | 20.4 | HOT PLATE ON AT 350C |
| 1215 | | | | | | | 99.2 | HOT PLATE OFF |
| 1225 | | 6.5 | 10.6 | | | | 98.3 | POWER SUPPLY ON |
| 1230 | | 6.5 | 10.7 | X | X | | 99.3 | SIDE 1=5mL, SIDE 2=5mL |
| 1235 | | 6.5 | 10.8 | X | X | | 99.4 | SIDE 1=8mL, SIDE 2=8mL |
| 1240 | | 6.5 | 10.8 | X | X | | 99.4 | SIDE 1=15mL, SIDE 2=11mL |
| 1245 | | 6.5 | 10.9 | X | X | | 99.4 | SIDE 1=22mL, SIDE 2=18mL |
| 1250 | | 6.5 | 10.9 | X | X | | 99.4 | SIDE 1=30mL, SIDE 2=22mL |
| 1255 | | 6.5 | 10.9 | X | X | | 99.4 | SIDE 1=40mL, SIDE 2=29mL |
| 1300 | | 6.5 | 10.9 | X | X | | 99.4 | SIDE 1=50mL, SIDE 2=35mL |
| 1305 | | 6.5 | 10.9 | X | X | | 99.4 | SIDE 1=58mL, SIDE 2=41mL |
| 1310 | | 6.5 | 10.9 | X | X | | 99.4 | SIDE 1=70mL, SIDE 2=50mL |

TEST METHOD - HEAT VESSEL UP TO 100 DEG C WITH HOT PLATE FOR 1.25 HRS. ENSURE DISTILLATION IS OCCURRING, WITH THE WATER LEVEL ABOVE THE PELTIER PLATE LINE. AFTER 1.25 HR TIMER, TURN OFF HOT PLATE UNDER VESSEL. WAIT FOR CONDENSATION DRIP TO STOP (10 MIN). DISCARD ALL WATER IN MEASUREMENT CUPS THEN TURN ON PELTIER PLATE POWER SUPPLY. WAIT FOR 45 MINUTES AND TURN OFF POWER SUPPLY. WAIT FOR ALL DRIPS TO STOP AND THEN MEASURE CONDENSED WATER IN CUPS. DO NOT ADD MORE WATER DURING 45 MINUTE TEST.
INITIAL VESSEL WITH AAVID THERMOLOY HEATSINK, ALL EXCESSIVE METALS REMOVED, INSULATED WITH POLYISOCYANURATE THERMAX SHEATHING.
DID NOT OPEN VESSEL OR FILL WATER UP AFTER INITIAL FILL TO 7.25".

REFERENCE - (TOP OF PELTIER PLATE IS 5.7" FROM BOTTOM (CENTERLINE OF PELTIER PLATE=4.7" FROM BOTTOM)) WATER REMAINING IN VESSEL AT 6.5625 = x 1410.94mL. ONE INCH OF WATER =215mL.

TEST START - TURNED OFF HOT PLATE AT @ 1215EST. TURNED ON PELTIER PLATE POWER SUPPLY AT 1225 EST. TURNED OFF PELTIER PLATE POWER SUPPLY AT 1310 EST.

OBSERVATIONS - TEST WAS TO CONFIRM HOW MUCH TIME IT TOOK TO REACH 100DEGC AND HOW MUCH WATER WAS CONSUMED DURING THAT TIME PERIOD.

VESSEL WATER LEVEL - LAST REFILLED TO 7.25" OF WATER (1550mL) FROM BOTTOM AT 1051EST WITH WATER. AT END OF TEST APPROXIMATELY 1307mL OF WATER WAS EXTRACTED FROM THE VESSEL.

WATER RECOVERED DURING TESTING - 117.9mL OR g OF WATER.
WATER RECOVERED DURING PRE-HEAT = 12.5mL OR g OF WATER.

*FIGURE 7*

| CALCULATIONS: |
|---|
| AVERAGE CURRENT= 10.83 A= 10.8 A |
| AVERAGE VOLTAGE= 6.5 V |
| TOTAL KJ OF ENERGY CONSUMED= 45MIN x 60SEC x 6.5V x 10.8A= 189.5KJ |
| TOTAL CHANGE IN ENTHALPY OF VAPORIZATION (TOTAL KJ OF WATER)= 117.9g/(18g/mol) x 40.66 KJ/mol=266.3 KJ |
| EFFICIENCY= (TOTAL KJ OF WATER)/(TOTAL KJ OF ENERGY CONSUMED) x100= (266.3 KJ/189.5 KJ) x100= 140.5% |

*FIGURE 7 Cont.*

| TIME | WATER T DEG C | PELTIER P/S VOLTS | PELTIER P/S AMPS | HEAT SINK T LEFT | HEAT SINK T RIGHT | RIGHT SIDE OUTLET | TOP OF VESSEL T DEG C | NOTES: TEST DURATION 45 MINUTES, WATER LEVEL TO 7.25" |
|---|---|---|---|---|---|---|---|---|
| 1035 | | | | | | | 20.4 | STARTED HEATING VESSEL AT 1025EST |
| 1150 | | | | | | | 99 | HOT PLATE ON AT 350C |
| 1200 | | 6.5 | 10.7 | | | | 98.8 | HOT PLATE OFF |
| 1205 | | 6.5 | 10.8 | X | X | | 99.1 | POWER SUPPLY ON |
| 1210 | | 6.5 | 10.8 | X | X | | 99.1 | SIDE 1=5mL, SIDE 2=5mL |
| 1215 | | 6.5 | 10.8 | X | X | | 99.1 | SIDE 1=12.5mL, SIDE 2=10mL |
| 1220 | | 6.5 | 10.8 | X | X | | 99.1 | SIDE 1=21mL, SIDE 2=16mL |
| 1225 | | 6.5 | 10.8 | X | X | | 99.1 | SIDE 1=30mL, SIDE 2=22mL |
| 1230 | | 6.5 | 10.8 | X | X | | 99.1 | SIDE 1=39.5mL, SIDE 2=27.5mL |
| 1235 | | 6.5 | 10.8 | X | X | | 99.1 | SIDE 1=47.5mL, SIDE 2=34mL |
| 1240 | | 6.5 | 10.8 | X | X | | 99.1 | SIDE 1=55.5mL, SIDE 2=40mL |
| 1245 | | 6.5 | 10.8 | X | X | | 99.1 | SIDE 1=65.5mL, SIDE 2=45.5mL |
| | | 6.5 | 10.8 | X | X | | 99.1 | SIDE 1=72.5mL, SIDE 2=50mL |

TEST METHOD - HEAT VESSEL UP TO 100 DEG C WITH HOT PLATE FOR 1.25 HRS. ENSURE DISTILLATION IS OCCURRING. WITH THE WATER LEVEL ABOVE THE PELTIER PLATE LINE. AFTER 1.25 HR TIMER, TURN OFF HOT PLATE UNDER VESSEL. WAIT FOR CONDENSATION DRIP TO STOP (10 MIN). DISCARD ALL WATER IN MEASUREMENT CUPS THEN TURN ON PELTIER PLATE POWER SUPPLY. WAIT FOR 45 MINUTES AND TURN OFF POWER SUPPLY. WAIT FOR ALL DRIPS TO STOP AND THEN MEASURE CONDENSED WATER IN CUPS. DO NOT ADD MORE WATER DURING 45 MINUTE TEST.
INITIAL VESSEL WITH AAVID THERMOLOY HEATSINK, ALL EXCESSIVE METALS REMOVED, INSULATED WITH POLYISOCYANURATE THERMAX SHEATHING. DID NOT OPEN VESSEL OR FILL WATER UP AFTER INITIAL FILL TO 7.25".

REFERENCE - (TOP OF PELTIER PLATE IS 5.7" FROM BOTTOM (CENTERLINE OF PELTIER PLATE=4" FROM BOTTOM)) WATER REMAINING IN VESSEL AT 6.5625 = x 1410.94mL. ONE INCH OF WATER =215mL.

TEST START - TURNED OFF HOT PLATE AT @ 1150 EST. TURNED ON PELTIER PLATE POWER SUPPLY AT 1200 EST. TURNED OFF PELTIER PLATE POWER SUPPLY AT 1245 EST.

OBSERVATIONS - TEST WAS TO CONFIRM HOW MUCH TIME IT TOOK TO REACH 100DEGC AND HOW MUCH WATER WAS CONSUMED DURING THAT TIME PERIOD.

VESSEL WATER LEVEL - LAST REFILLED TO 7.25" OF WATER (1550mL) FROM BOTTOM AT 1021EST WITH WATER. AT END OF TEST APPROXIMATELY 1302.2mL OF WATER WAS EXTRACTED FROM THE VESSEL.

WATER RECOVERED DURING TESTING - 128.1mL OR g OF WATER.
WATER RECOVERED DURING PRE-HEAT = 29.9mL OR g OF WATER.

*FIGURE 8*

| |
|---|
| CALCULATIONS: |
| AVERAGE CURRENT = 10.79 A = 10.8 A |
| AVERAGE VOLTAGE = 6.5 V |
| TOTAL KJ OF ENERGY CONSUMED = 45MIN x 60SEC x 6.5V x 10.8A = 189.5KJ |
| TOTAL CHANGE IN ENTHALPY OF VAPORIZATION (TOTAL KJ OF WATER) = 128.1g / (18g/mol) x 40.66 KJ/mol = 289.4 KJ |
| EFFICIENCY = (TOTAL KJ OF WATER)/(TOTAL KJ OF ENERGY CONSUMED) x 100 = (289.4 KJ/189.5 KJ) x 100 = 152.7% |

*FIGURE 8 Cont.*

WATER PURIFICATION DEVICE

CROSS REFERENCE TO RELATED APPLICATIONS

This application claims the benefit of priority to U.S. Provisional Appl. No. 62/485,185, filed Apr. 13, 2017, the entire contents of which are incorporated by reference herein.

TECHNICAL FIELD

This disclosure relates to the field of water purification, and in particular to purifying water through distillation or evaporation.

BACKGROUND

Water purification devices can use techniques such as filtration, activated charcoal adsorption, chemical disinfection, ultraviolet (UV) purification, distillation, flocculation, and reverse osmosis. The filtration technique includes using porous materials such as charcoal or ceramics to remove particulates, dust, and pathogens from impure water. The activated charcoal adsorption technique includes using activated carbon with high surface area to adsorb unwanted compounds from impure water. The chemical disinfection technique includes using chemicals such as iodine and chlorine to remove pathogens and microorganisms in impure water. The UV purification technique includes exposing the impure water to UV light to reduce the amount of microbes in the impure water. The distillation technique includes heating the impure water to generate water vapor, which can be condensed into purified liquid water. The flocculation technique includes using clarifying agents to remove suspended colloids from impure water. The reverse osmosis technique uses a semipermeable membrane to remove ions, molecules, and larger particles from water.

SUMMARY

According to one aspect, the subject matter described in this disclosure relates to a water purification device. The water purification device includes a heating vessel adapted to receive impure water and output water or water vapor. The device further includes at least one heating element arranged outside and in thermal contact with the heating vessel, configured to provide heat to the impure water. The device also includes at least one heat exchanger to exchange heat between the impure water and the water or water vapor to raise the temperature of the impure water.

High temperature Peltier cells with >100 degrees Celsius maximum hot side temperature are can be attached to a 8-12 sided polygon vessel where each side of the vessel has the hot side of a Peltier cell centered on the outside of each face (each face is wider than the cell by 1-2 inches). On the cold side of each cell is a high efficiency heat sink/water vapor condenser that the water vapor contacts or passes through.

In some implementations, the device has greater than about 140% thermodynamic efficiency. In some other implementations, the device has greater than about 152% efficiency. This means that a significant portion of the enthalpy of vaporization of water is recovered on the heat sink/water vapor condenser, and then reused to heat or boil more impure water. Further substantial increases in efficiency is achieved by lightly brushing the inner super-heated surface opposite each Peltier cell with a heat resistant plastic brush driven by a motor and mechanical feed through or a magnetically coupled drive system. Brushing the super-heated surfaces will reduce the differential temperature required to initiate boiling as well as reduce the formation of salt scale/buildup and the resulting of maintenance of the device. Reducing the temperature differential, or the degree of super-heating, increases the recovery of enthalpy of vaporization, by lowering the heat differential at the inner super-heated surface.

The device reduces the differential temperature of the super-heated (boiling) surface zone to facilitate the change of state of impure water at a boiling temperature of the impure water. A high efficiency heat sink/water vapor condenser, with optimized surface area, heat conduction, and surface geometries (including nanostructures) facilitates the change of state of water vapor at 100 degrees Celsius to liquid water at 100 degrees Celsius. A series of heat exchangers transfer the heat of the purified water to the waste water so that the incoming feed water is at or near 100 degrees Celsius when entering the vessel. A mass measuring device measures the flow of liquid water from the device continuously to maintain the incoming feed water so as to keep the water level in the vessel at the desired level. The device includes an 8-12 sided copper vessel with anti-corrosive or corrosion resistant coatings, such as, for example, a Tantaline coating, to optimize heat conduction and prevent corrosion, while allowing for cleaning the vessel with acidic cleaning solution. The device is well insulated. The device is adaptable to removing and replacing failed Peltier cells separately or in conjunction with their respective attached heat sinks.

BRIEF DESCRIPTION OF THE DRAWINGS

The accompanying drawings, which are incorporated herein and constitute part of this specification, illustrate exemplary examples of the disclosure, and together with the general description given above and the detailed description given below, serve to explain the features of the various examples.

FIGS. 7 and 8 show test data related to example water purification devices according to various examples.

Like reference numbers and designations in the various drawings indicate like elements.

DETAILED DESCRIPTION

Various examples will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Figure 1:
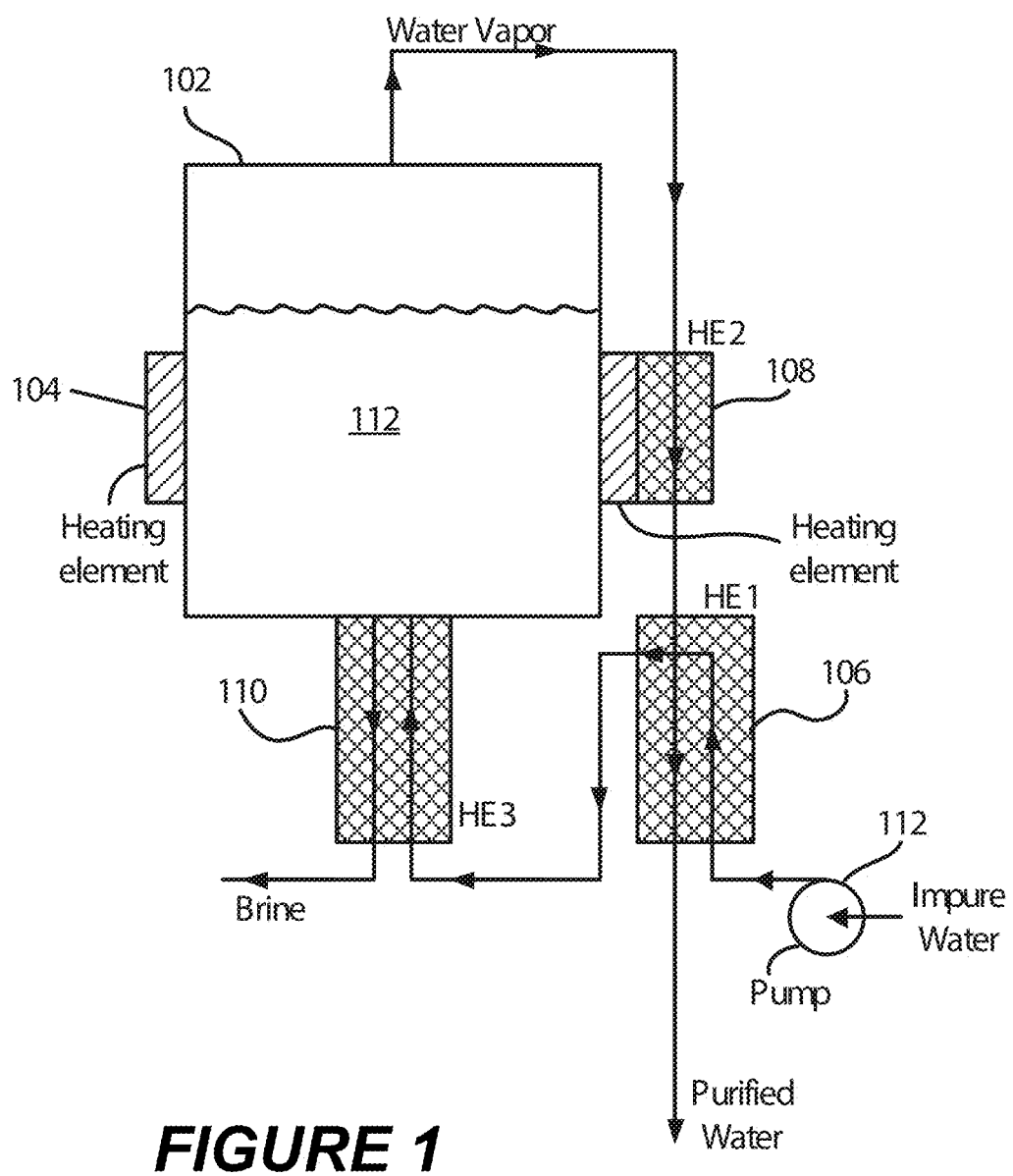
FIG. 1 depicts a representation of an example water purification device in accordance with various examples.

FIG. 1 depicts a representation of an example water purification device 100. In particular, FIG. 1 depicts fluid flows of water and water vapor within the water purification device. The water purification device 100 includes a heating vessel 102, one or more heating elements 104, a first heat exchanger 106, a second heat exchanger 108, and a third heat exchanger 110. The heating vessel 102 is configured to contain water 112 to be purified. The heating vessel 102 can be made of one or more materials such as, for example, porcelain, glass, plastic, and metal (such as, for example, copper, aluminum, and steel). In some example implementations, portions of the heating vessel 102 may be made of materials that are different from the materials used for forming the remainder of the heating vessel 102. For example, in some example implementations, the portion of the heating vessel 102 adjacent to the location of the one or more heating elements 104 may be formed using a metal to allow for high heat conductivity, while the remainder of the heating vessel 102 may be formed of an insulating material such as porcelain or plastic to reduce loss of heat from inside of the heating vessel 102. In some implementations, the inner surface of the heating vessel 102 can be coated with an anti-corrosive or corrosion resistant coatings, such as, for example, Tantaline, to improve heat conduction, to reduce the risk of corrosion, and to allow ease of cleaning the heating vessel 102 with acidic cleaning solutions.

The heating vessel 102 includes a bottom inlet to allow impure water 112, which is to be purified, into the heating vessel 102. The heating vessel 102 also includes a concentrate outlet to allow saline water, brackish water, brine, or other saturates to exit the heating vessel 102. The heating vessel 102 also includes a top outlet to allow water vapor, resulting from the boiling of the impure water 112 by the heating elements 104, to exit the heating vessel 102.

The heating elements 104 can be disposed on one or more outside surfaces of one or more sidewalls of the heating vessel 102. In some example implementations, the sidewalls of the heating vessel 102 can define windows or apertures that allow direct contact between the heating element 102 surface and the impure water 112. The heating elements 104 can include heaters such as, for example, resistance-based heaters, thermoelectric heaters, induction based heaters, etc. In some example implementations, a controller (not shown) can be used to control and regulate the operation of the heating elements 104. For example, the controller can control the ON/OFF time, voltage supply, current supply, duty cycle, etc., of the heating elements 104 to provide the desired amount of heat to the heating vessel 102 and the impure water 112.

The water vapor produced by heating or boiling the impure water 112 is released from the heating vessel through the top outlet. The water vapor is routed to an inlet of the second heat exchanger 108. In one example implementation, the second heat exchanger 108 can include a heat sink provided for the heating element 104. In some example implementations, the water purification device 100 can include several second heat exchangers 108 such that a second heat exchanger 108 is coupled with each heating element 104. In some example implementations, the number of second heat exchangers 108 can be less than the number of heating elements 104 such that at least one heating element 104 does not have an attached second heat exchanger 108. In implementations where the heating element 104 includes a thermoelectric heater, such as a Peltier cell, the heat sink can be placed in thermal contact with a cold side of the Peltier cell. The cold side of the Peltier cell can be at a temperature that is lower than the temperature of the water vapor released from the heating vessel. Thus, when the water vapor passes through the second heat exchanger 108, and comes in contact with the heat sink, at least a portion of the water vapor changes state from water vapor to liquid water. The change in state from vapor to liquid releases heat, which is equivalent to the heat of condensation of water. This heat released from change in state of the water vapor is transferred back into heating the impure water 112. The heat can also be transferred back to the heating element 104, which can reduce the energy required to by the heating element 104 to maintain a desired temperature to heat the impure water 112, thereby improving the efficiency of the purification device 100. For example, in instances where the heating element 104 includes Peltier cells, the transferred heat can be used to increase the temperature of the cold side of the Peltier cells. The increase in the temperature of the cold side of the Peltier cell reduces the amount of electric current (and therefore energy) needed to maintain a desired temperature at the hot side of the Peltier cell, thereby improving the efficiency of the purification device 100.

In some implementations, the heat sink included in the second heat exchanger 108 can be separated from the heating element 104, and instead disposed on the outside of the sidewall of the heating vessel such that the heat of condensation generated by the condensation of the water vapor is transferred by the second heat exchanger 108 to the impure water 112 within the heating vessel 102. In some example implementations, the heat sink can include densely placed thin fins with large surface area to allow for a large amount of transfer of heat resulting from the condensation of the water vapor. In some example implementations, the second heat exchanger 108 can include nanostructures that facilitate the change of state of the water vapor at low differential temperatures.

The water vapor and the condensed water are passed through the first heat exchanger 106. The first heat exchanger 106 transfers heat from the water vapor and the condensed water to the impure water to be introduced into the heating vessel 102. As mentioned above, the water vapor released by the heating vessel 102 is passed through the second heat exchanger 108, which causes the water vapor to at least partially change state into liquid water. The liquid water and any remaining water vapor at an outlet of the second heat exchanger 108 is further passed through the first heat exchanger 106. The liquid water and any water vapor enter the first heat exchanger 106 through a first input port and is output through a first output port. In addition, the impure water, enters through a second input port and output through a second output port. The first heat exchanger 106 facilitates transfer of heat from the liquid water and water vapor to the impure water. The impure water is typically at a substantially lower temperature than that of the liquid water and water vapor. Therefore, at the second output port, the impure water is output having a higher temperature than the temperature of the impure water at the second input port. The first heat exchanger 106 facilitates the condensation of any remaining water vapor, and transfer the heat of condensation generated by the change of state of the water vapor to the impure water. In addition, the first heat exchanger 106 facilitates the transfer of heat from the liquid water to the impure water, thereby reducing the temperature of the liquid water output at the first output port. In some example implementations, the first heat exchanger is designed to reduce the temperature of the liquid water at the first output port substantially to ambient temperature.

The impure water is output from the second output port of the first heat exchanger 106 and introduced into the third heat exchanger 110. The third heat exchanger 110 facilitates the transfer of heat from the concentrate discharged by the heating vessel 102 to further raise the temperature of the impure water before it enters the heating vessel 102. The third heat exchanger includes a first input port for receiving impure water output by the first heat exchanger 106 and a first output port for outputting the impure water into the heating vessel. The third heat exchanger 110 also includes a second input port for receiving the concentrate discharged by the heating vessel 102 and a second output port for outputting the concentrate. The first output port is communicably connected to the bottom inlet of the heating vessel 102.

The combination of the first heat exchanger 106 and the third heat exchanger 110 contribute towards increasing the temperature of the impure water introduced into the heating vessel 102. The higher the temperature of the impure water is before being introduced into the heating vessel, the lower the energy required by the heating elements 104 to increase the temperature of the impure water to boiling point. By using the heat of the water vapor and the concentrate output by the heating vessel to increase the temperature of the impure water, the efficiency of the water purification device 100 is improved.

The heat exchangers discussed herein can include parallel-flow, counter-flow, or a cross-flow heat exchanger arrangements. The heat exchangers also can include one or a combination of shell and tube, plate heat, plate and shell, plate fin, pillow plate, dynamic scraped surface, and other types of heat exchanger designs.

In some example implementations, the sequence of heat exchangers through which the water vapor and the impure water are passed can be different from that shown in FIG. 1. For example, in some example implementations, the water vapor can be passed first through the first heat exchanger 106 and then through the second heat exchanger 108. In some example implementations, the impure water can be passed through the third heat exchanger 110 followed by the first heat exchanger 106 prior to being introduced into the heating vessel 102.

In some example implementations, the water purification device 100 can be enclosed within a housing (not shown) to protect the various components and to reduce the loss of heat energy from the water purification device. The housing having high degree of insulation can further improve the efficiency of the water purification device 100.

In some example implementations, a pump 114 can be used to pump the impure water through the first heat exchanger 106 and the third heat exchanger 110 into the heating vessel 102. In some example implementations, the water purification device 100 also can include a level sensor or a flow meter to measure the level of water in the heating vessel 102. The controller can receive the information from the sensor or the meter and control the pump 114 to ensure that a desired level of impure water 112 is maintained in the heating vessel 102.

Figure 2:
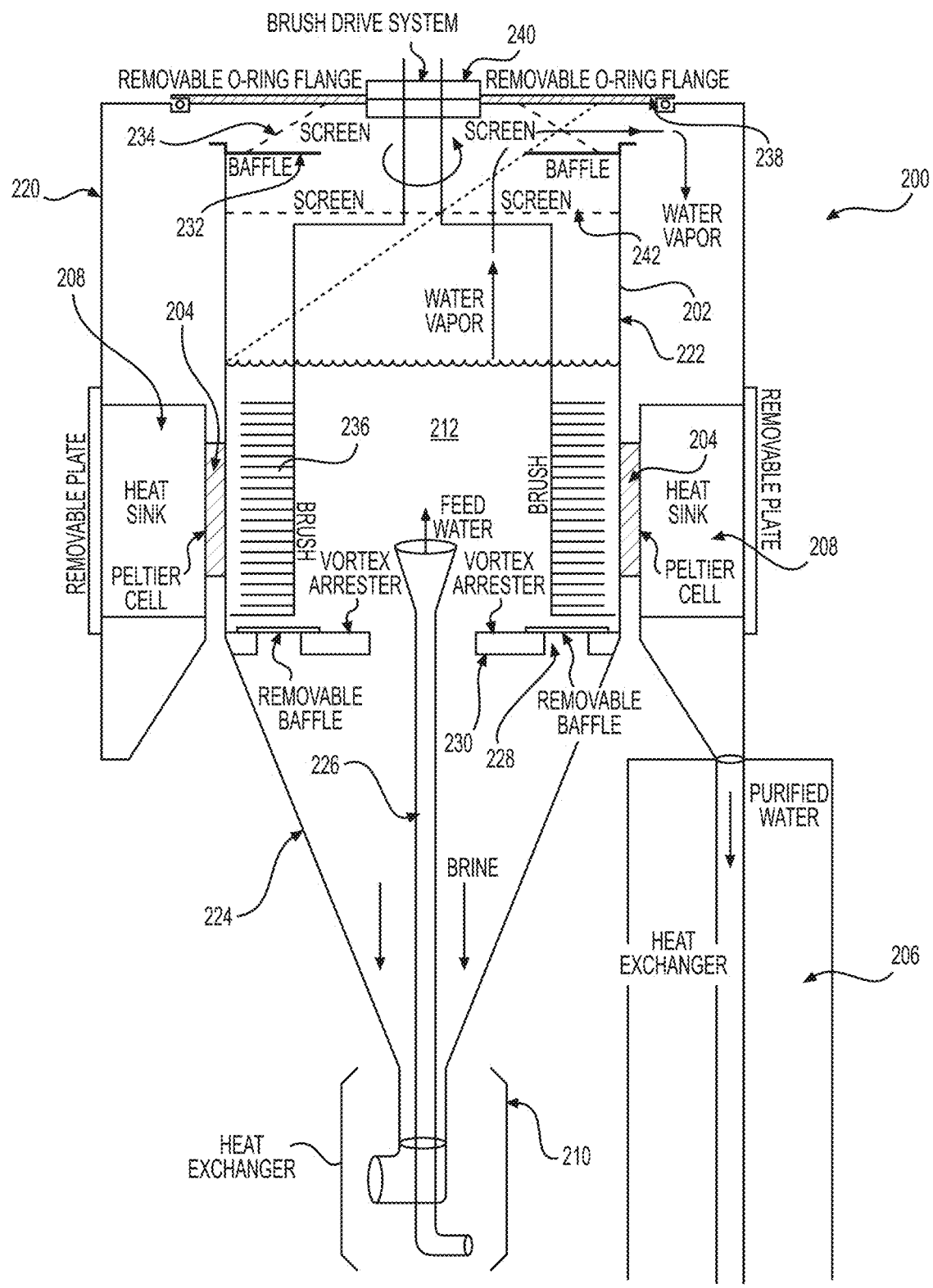
FIG. 2 depicts a representation of another example water purification device according to various examples.

FIG. 2 depicts a representation of another example water purification device 200. For example, the water purification device 200 can be representative of the water purification device 100 shown in FIG. 1. FIG. 2 depicts a substantially cross-sectional view of the water purification device 200. Some portions of the water purification device 200 are not shown for simplicity. The water purification device 200 includes a heating vessel 202, an outer housing 220, one or more Peltier cells 204, a first heat exchanger 206, a second heat exchanger 208, and a third heat exchanger 210. The first, second, and third heat exchangers 206, 208, and 210 shown in FIG. 2 can be similar to the first, second, and third heat exchangers 106, 108, and 110 discussed above in relation to FIG. 1. The Peltier cells 204 can represent an example of the heating element 104 discussed above in relation to FIG. 1.

The heating vessel 202 includes an upper portion 222 and a lower portion 224 extending from a bottom of the upper portion 222. The upper portion 222 can be substantially cylindrical in shape (discussed further below in relation to FIGS. 3 and 4), while the lower portion can be substantially conical in shape, with the narrow end of the conical shape being positioned away from the bottom of the upper portion 222. The narrow end of the lower portion 224 is connected to the third heat exchanger 210. The narrow end also includes a bottom outlet for discharging brine and a bottom inlet to allow impure water 212 to enter the heating vessel 202. A conduit 226 positioned inside the heating vessel 206 extending from the bottom inlet to the upper portion 222 allows impure water 212 to be discharged into the upper portion 222 of the heating vessel 202. The conduit 226 and the third heat exchanger 210 allow heat exchange between the brine discharged by the heating vessel 202 and the incoming impure water 212 before the impure water 212 is discharged into the heating vessel 202. The heat exchange through the third heat exchanger 210 and the conduit 226 can raise the temperature of the impure water 212 before it is discharged into the upper portion 222 of the heating vessel 2

The bottom of the upper portion 222 of the heating vessel 202 includes a bottom removable baffle 228 and a vortex arrestor 230. The bottom removable baffle 228 can have an outer perimeter that conforms to the inner perimeter of the upper portion 222. The bottom removable baffle 228 can define an opening in the center through which the conduit 226 can pass, and within which the vortex arrestor 230 can be disposed. The vortex arrestor 230 reduces the formation of a vortex in the impure water 221, within the heating vessel 202, caused due to stirring by a brush assembly 236 (discussed below). By reducing the formation of the vortex, the loss of heat from the upper portion 222 of the heating vessel 202 to the lower portion 224 can be reduced. As a result, the efficiency of the purification device 200 increases. The vortex arrestor 230 can include, for example, an annular ring that includes an opening through which the conduit 226 can pass. In some implementations, the vortex arrestor 230 can include a plurality of fins that disrupt the stirring of the impure water 221, thereby reducing the formation of the vortex. In some implementations, the vortex arrestor 230 can include structures other than, or in addition to, fins to reduce the formation of the vortex, which structures can include, for example, serrations, indentations, protrusions, etc.

The upper portion 222 of the heating vessel 202 includes a top removable baffle 232 and a first screen 234. The top baffle 232 can have an outer perimeter that conforms to the inner perimeter of the upper portion 222. The top removable baffle 232 can define an opening in the center through which a brush assembly 236 can pass through. The upper surface of the top removable baffle 232 can support the first screen 234, which can have a conical or a cylindrical shape. The first screen 234 can include perforations that allow water vapor to pass through but obstruct the passage of aerosol, which can include impurities discharged by the boiling impure water 212. The first screen 234 can rest on the top surface of the top removable baffle 232, which includes an elevated surface that rests on the perimeter of the top portion 222 of the heating vessel 202. The elevated surface and the top surface of the top removable baffle 232 can form a weir, which can control the flow of any liquid water condensate formed on the outside of the first screen 234.

A top portion of the first screen 234 abuts with a removable flange 238, which covers a top opening in the housing 220, while a bottom portion of the first screen 234, as mentioned above, rests on the top removable baffle 232. The removable flange 238 and the top removable baffle 232 can be arranged to form an air-tight seal at both ends of the first screen 234 to reduce or prevent the water vapor or aerosol to bypass the first screen 234. In some example implementations, the first screen 234 can include more than one layer of perforated screens to improve obstruction of aerosol. In some example implementations, the perforations within the more than one layer of perforated screens can be offset to improve obstruction of aerosol by passage of water vapor.

The removable flange 238 defines an opening in its center to accommodate a brush drive coupling 240 that couples the brush assembly 236 to a drive shaft (not shown). The brush drive coupling 240 can be an air-tight coupling that can allow the transfer of torque on the drive shaft to the brush assembly 236. In some example implementations, the brush drive coupling 240 can include magnetic coupling, gear coupling, bearing coupling, and the like.

The brush assembly 236 can rotate along an axis that is along the longitudinal axis of the heating vessel 202. The brush assembly includes a plurality of brushes that make contact with an inner surface of the heating vessel 202 at a location that is opposite to where the Peltier cells 204 are located on the outside of the heating vessel 202. In some example implementations, the brushes may not make contact, but are in close proximity with the inner surface of the heating vessel 202. The rotation of the drive shaft causes the brush assembly 236 to turn as well, resulting in the brushes to scrape the inner surface of the heating vessel 202. The movement of the brushes can clean the inner surface of the heating vessel 202 as well as cause agitation in the vicinity of the location of the Peltier cells 204. The combination of the cleaning of the inners surface as well as the agitation can result in a reduction in the superheating of the impure water 212 in the vicinity of the Peltier cells 204. By reducing the risk of superheating of the impure water 212, the heat energy that would otherwise be wasted in superheating the impure water 212 is applied towards boiling the impure water 212. Therefore, the efficiency of the purification device 200 is improved. In some example implementations, the drive shaft can be manually rotated or can be rotated using a motor.

In some example implementations, the brush assembly 236 can include a drum concentric to the heating vessel 202, where a set of brushes are installed on the outer surface of the drum. The drum can be coupled to the drive shaft through the brush drive coupling 240 such that the rotation of the drive shaft causes the drum to rotate, which in turn causes the brushes on the outer surface of the drum to clean the inner surface of the heating vessel 202 and agitate the impure water 212 in the vicinity of the Peltier cells 204. In some example implementations, the brush assembly 236 can be configured to have a reciprocal movement along the longitudinal axis of the heating vessel 202. For example, the brush assembly 236 can move up and down along the length of the heating vessel 202, causing the brushes to move longitudinally, instead of rotationally, with respect to the inner surface of the heating vessel 202.

The heating vessel 202 can also include a second screen 242 disposed between the surface of the impure water 212 and the first screen 234. The second screen can have a perimeter that conforms to the perimeter of the inner surface of the heating vessel 202. The second screen can define an opening to allow a portion of the brush assembly 236 to couple with the brush assembly coupling 240. The second screen 242 can also include perforations similar to those discussed above in relation to the first screen 234. The second screen 242 further reduces the amount of the aerosol that makes contact with the first screen 234, thereby further reducing the risk of the aerosol from passing through the first screen 234. In some implementations, the second screen 242 can be coupled to the shaft of the brush assembly so that the second screen 242 turns with the rotary action of the brush assembly 236. The rotary action of the second screen 242 can allow any portion of the second screen 242 to swath a large area of the inside of the heating vessel 202, thereby improving the obstruction of aerosol.

The heating vessel 202 can be made of one or more materials such as, for example, porcelain, glass, plastic, and metal (such as, for example, copper, aluminum, and steel). In some example implementations, portions of the heating vessel 202 may be made of materials that are different from the materials used for forming the remainder of the heating vessel 202. For example, in some example implementations, the portion of the heating vessel 202 adjacent to the location of the one or more heating elements 204 may be formed using a metal to allow for high heat conductivity, while the remainder of the heating vessel 202 may be formed of an insulating material such as porcelain or plastic to reduce loss of heat from inside of the heating vessel 202. In some example implementations, the inner surface of the heating vessel 102 can be coated with Tantaline to improve heat conduction, to reduce the risk of corrosion, and to allow ease of cleaning the heating vessel 202 with acidic cleaning solutions.

The water vapor produced by the boiling of the impure water passes through the first screen 234 towards the second heat exchanger 208. The second heat exchanger 208 can be similar to the second heat exchanger 108 discussed above in relation to FIG. 1. The second heat exchanger 208 can include a heat sink that is thermally coupled to the Peltier cells 204. In some example implementations, the heat sink can be coupled to a cold side of the Peltier cells 204. The water vapor passing over the heat sink, which is at a lower temperature than that of the water vapor, causes at least a portion of the water vapor to change state into liquid water. This change in state is accompanied with a release in a heat of condensation, which is fed back into heating of the impure water 212 in the heating vessel. In some example implementations, the second heat exchanger 208 can be in contact with the heating vessel 202 such that the heat from the water vapor can be directly provided to the impure water 212. The heat of condensation can also be fed to the heating elements 204. In instances where the heating element 204 includes Peltier cells, the transferred heat can be used to increase the temperature of the cold side of the Peltier cells. The increase in the temperature of the cold side of the Peltier cell reduces the amount of electric current (and therefore energy) needed to maintain a desired temperature at the hot side of the Peltier cell, thereby improving the efficiency of the purification device 200.

The water vapor and the condensed liquid are then passed through a first heat exchanger 206. The first heat exchanger 206 can be similar to the first heat exchanger 106 discussed above in relation to FIG. 1. The first heat exchanger 206 facilitates transfer of heat from the water vapor and the condensed liquid to the impure water being fed into the heating vessel. The heat of condensation generated from the condensation of the water vapor, and any heat transferred from the condensed liquid is transferred to the impure water, thereby raising the temperature of the impure water before it enters the heating vessel 202. While not shown in FIG. 2, the first heat exchanger 206 includes an inlet and an outlet for the impure water, as well is heat exchange elements to transfer heat from the water vapor an condensed liquid to the impure water.

In some example implementations, the purification device can include a pump, similar to the pump 112 discussed above in relation to FIG. 1, to pump the impure water through the first and third heat exchangers 206 and 210 and into the heating vessel 202. The heating vessel 202 can also include a level sensor or a flow meter to determine the level of the impure water 212 within the heating vessel 202. The purification device 200 also can include a controller that can receive input from the level sensor or the flow meter and control the pump such that a desired level of the impure water 212 is maintained within the heating vessel 202. The controller can also control a motor to rotate the drive shaft coupled to the brush assembly 236.

Figure 3:
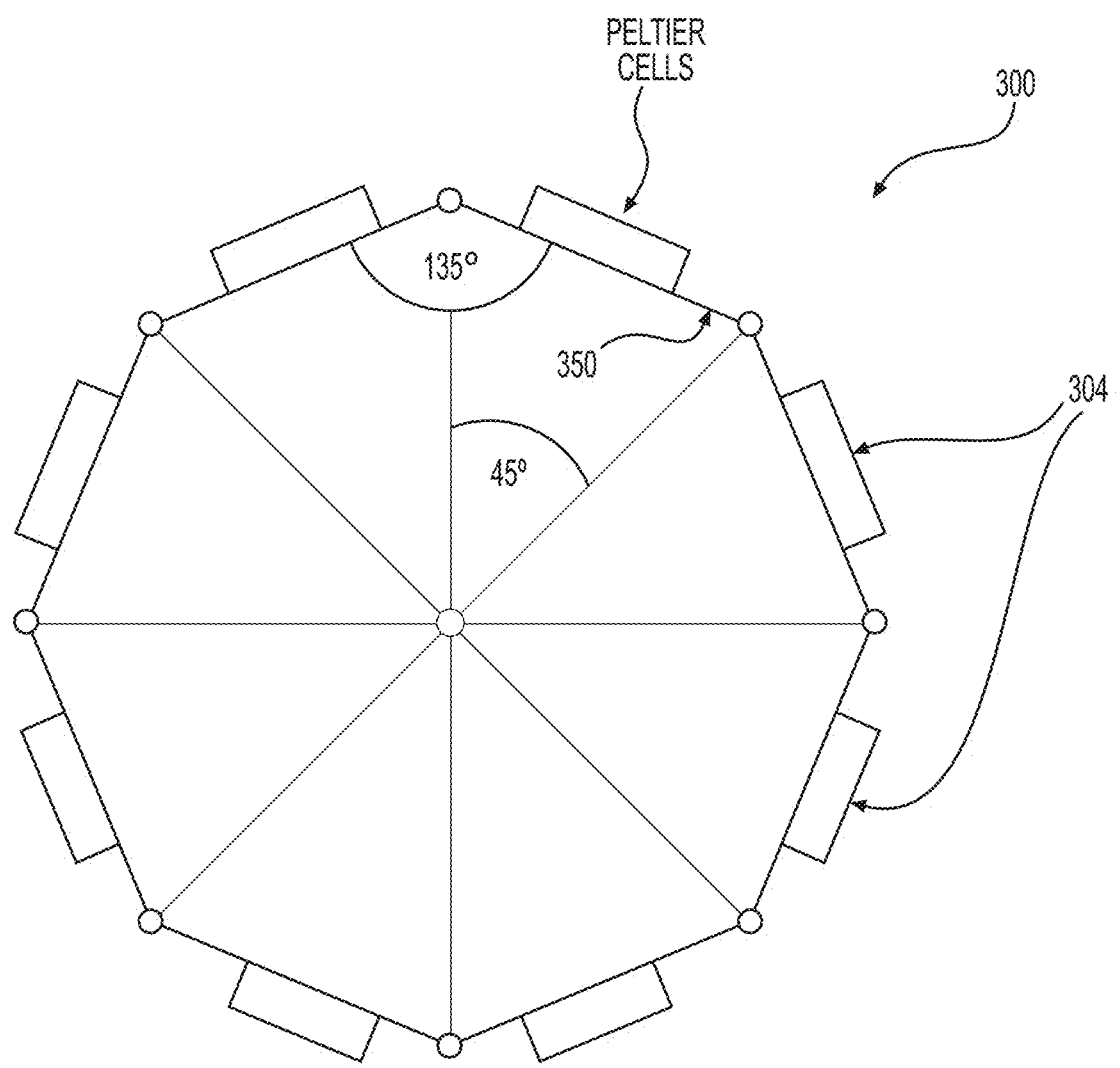
FIG. 3 shows a cross-sectional representation of a first heating vessel according to various examples.

FIG. 3 shows a cross-sectional representation of a first heating vessel 300. In some example implementations, the first heating vessel 300 can be used to implement the heating vessel 202 discussed above in relation to FIG. 2. The first heating vessel 300 includes 8 sides 350 arranged in an regular octagonal configuration. The angle between any two adjacent sides 350 is about 135 degrees. The outside surface of each side 350 receives a Peltier cell or a heating element 304. In some example implementations, the width of the sides 350 can be sufficient to accommodate the width of the Peltier cells 304.

Figure 4:
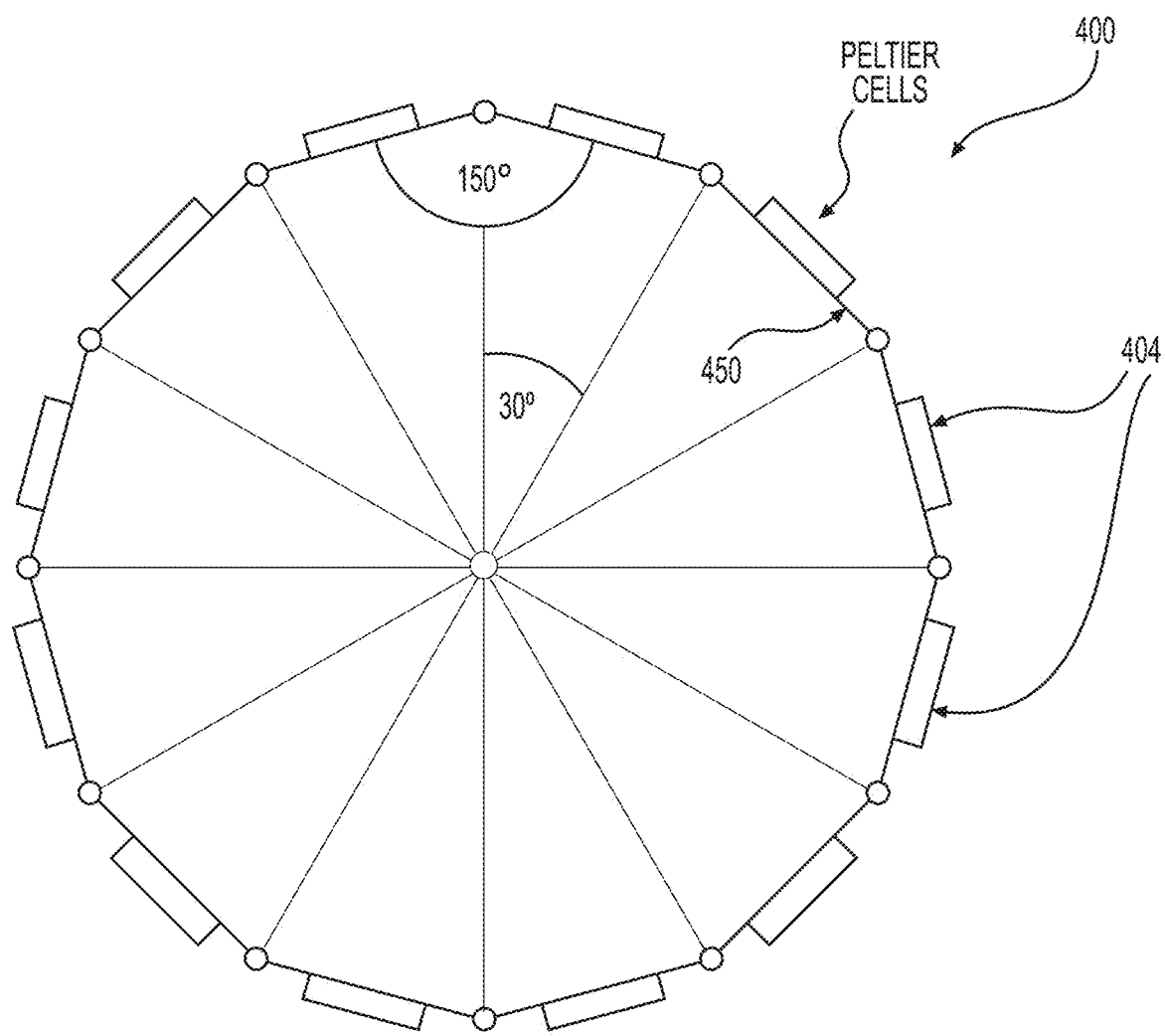
FIG. 4 shows a cross-sectional representation of a second heating vessel according to some examples.

FIG. 4 shows a cross-sectional representation of a second heating vessel 400. In some example implementations, the second heating vessel 400 can be used to implement the heating vessel 202 discussed above in relation to FIG. 2. The second heating vessel 400 includes 12 sides 450 arranged in an regular dodecagon configuration. The angle between any two adjacent sides 450 is about 150 degrees. The outside surface of each side 450 receives a Peltier cell or a heating element 404. In some example implementations, the width of the sides 450 can be sufficient to accommodate the width of the Peltier cells 404. In some example implementations, the heating vessel 202 can have a number of sides that is different from that shown in FIGS. 3 and 4. In some example implementations, the widths of the sides of the heating vessels 300 and 400 can be non-uniform.

It should be noted that the number of sides in a heating vessel is not limited to that shown in FIGS. 3 and 4, and can include any number of sides up to the vessel being substantially circular or elliptical in cross-section.

In some example implementations, the water purification devices discussed herein can be operated at atmospheric pressure. In some other example implementations, the water purification devices discussed herein can be operated at a pressure that is below or greater than the atmospheric temperature. For example, the water purification device can be operated at a pressure that is greater than the atmospheric temperature. The outer housing of the water purification devices can include sealants that allow the maintenance of differential pressure between the inside of the housing and the atmospheric pressure.

In some example implementations, the purification device discussed herein can be provided electrical power through one or more of a set of batteries and a set of solar cells. In some example implementations, the purification devices discussed herein can be enclosed within a housing that has insulation material to reduce the amount of heat that is dissipated into the environment, and is instead used to raise the temperature of the impure water. In some example implementations, the purification devices discussed herein can be portable to allow ease of carrying the purification devices to various locations where there may be a need to purify impure water.

The purification devices discussed herein provide high efficiency in purifying water. In particular, the transfer of heat from the water vapor and condensed liquid to the impure water and from the concentrate (or brine) to the impure water can cause the temperature of the impure water to rise to considerably close to a boiling temperature of the impure water. As such, only a small amount of additional energy is needed from the heating elements to further raise the temperature of the impure water to its boiling temperature. Further, the cleaning and agitation action by the brush assembly reduce the risk of superheating of the impure water in the vicinity of the heating elements inside the heating vessel. This causes the energy that would otherwise be wasted to superheat the impure water can be instead used to raise the temperature of the impure water to its boiling point.

Figure 5A:
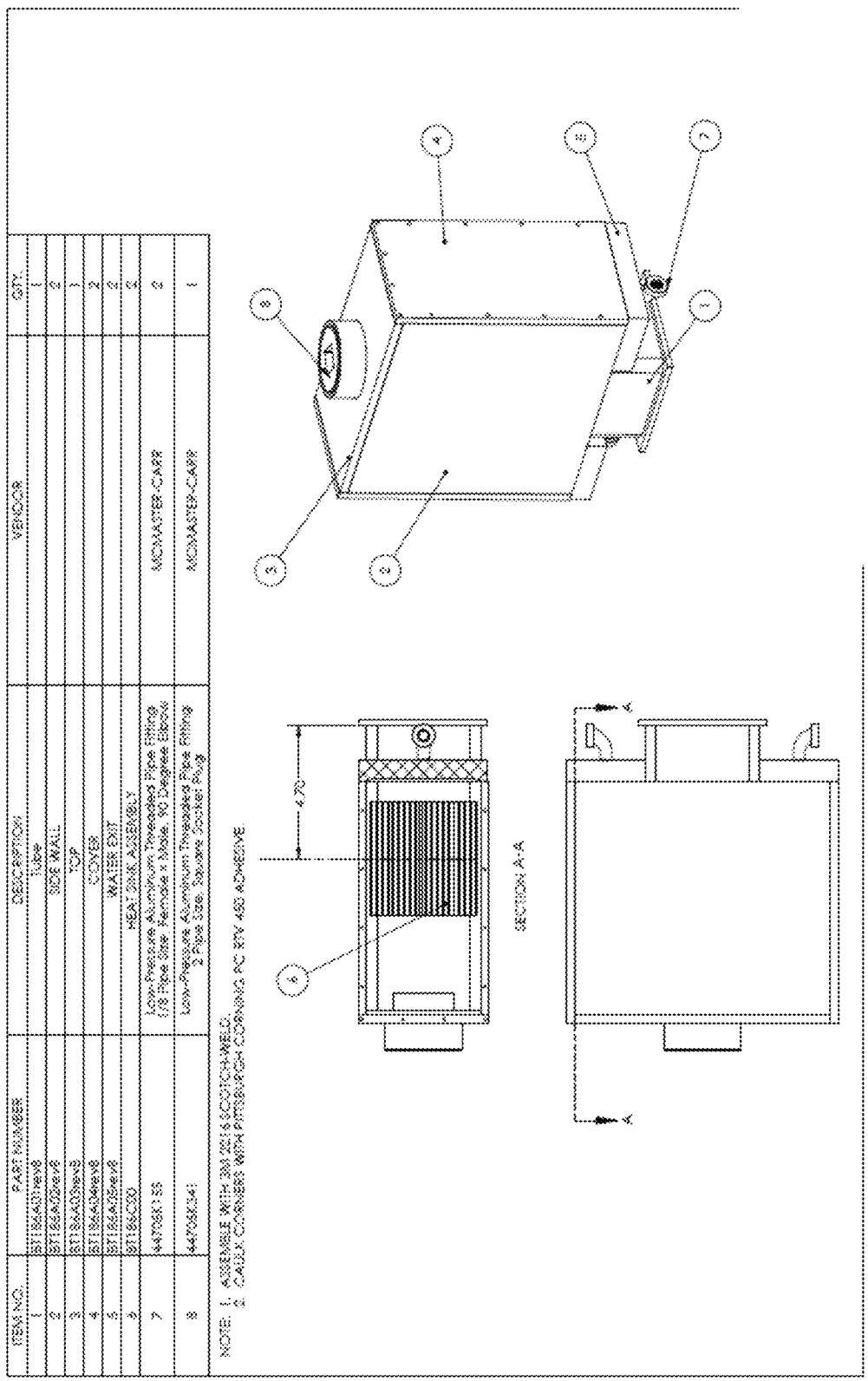
FIGS. 5A-5I show representations of various components of an example water purification device according to various examples.
Figure 5B:
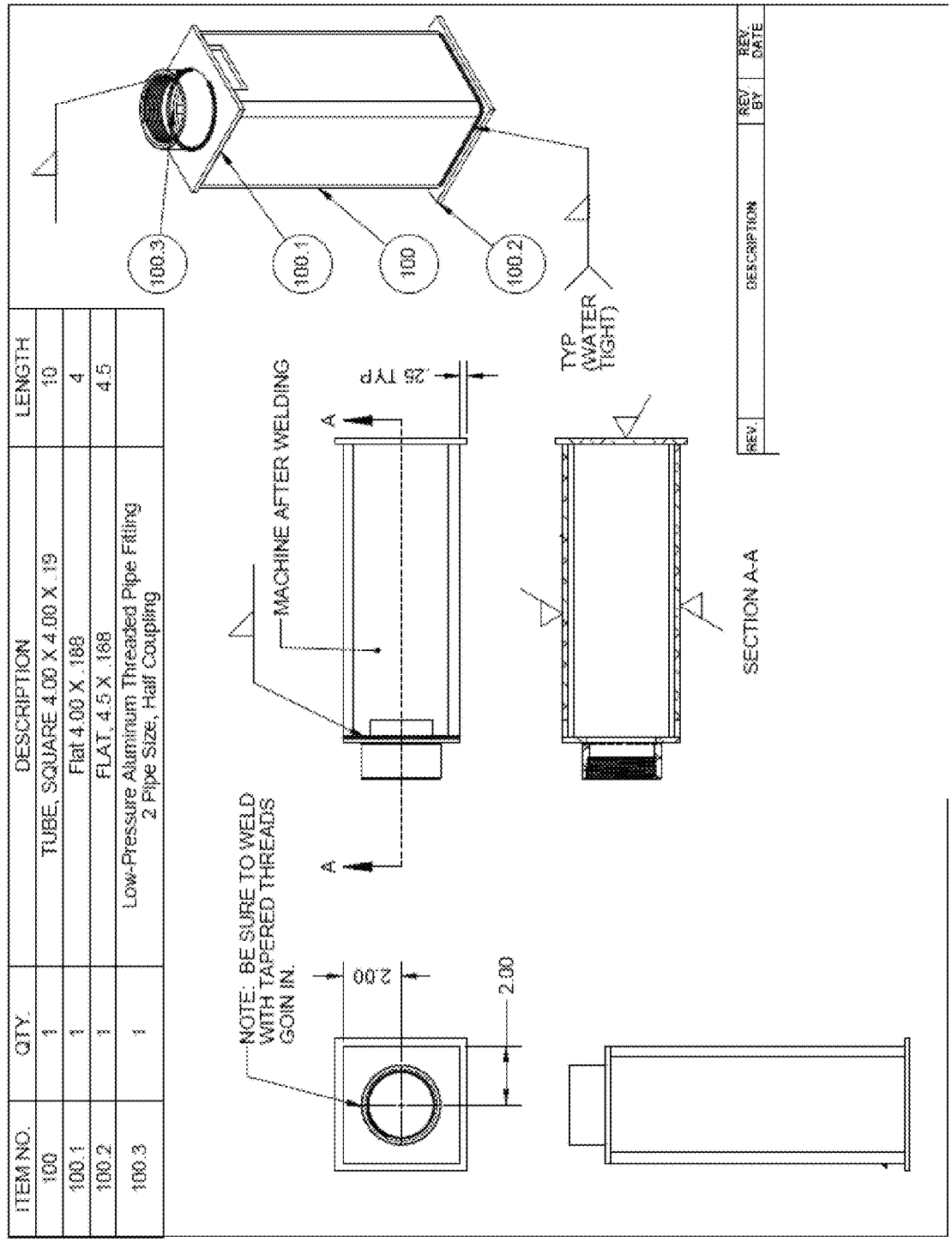
Figure 5C:
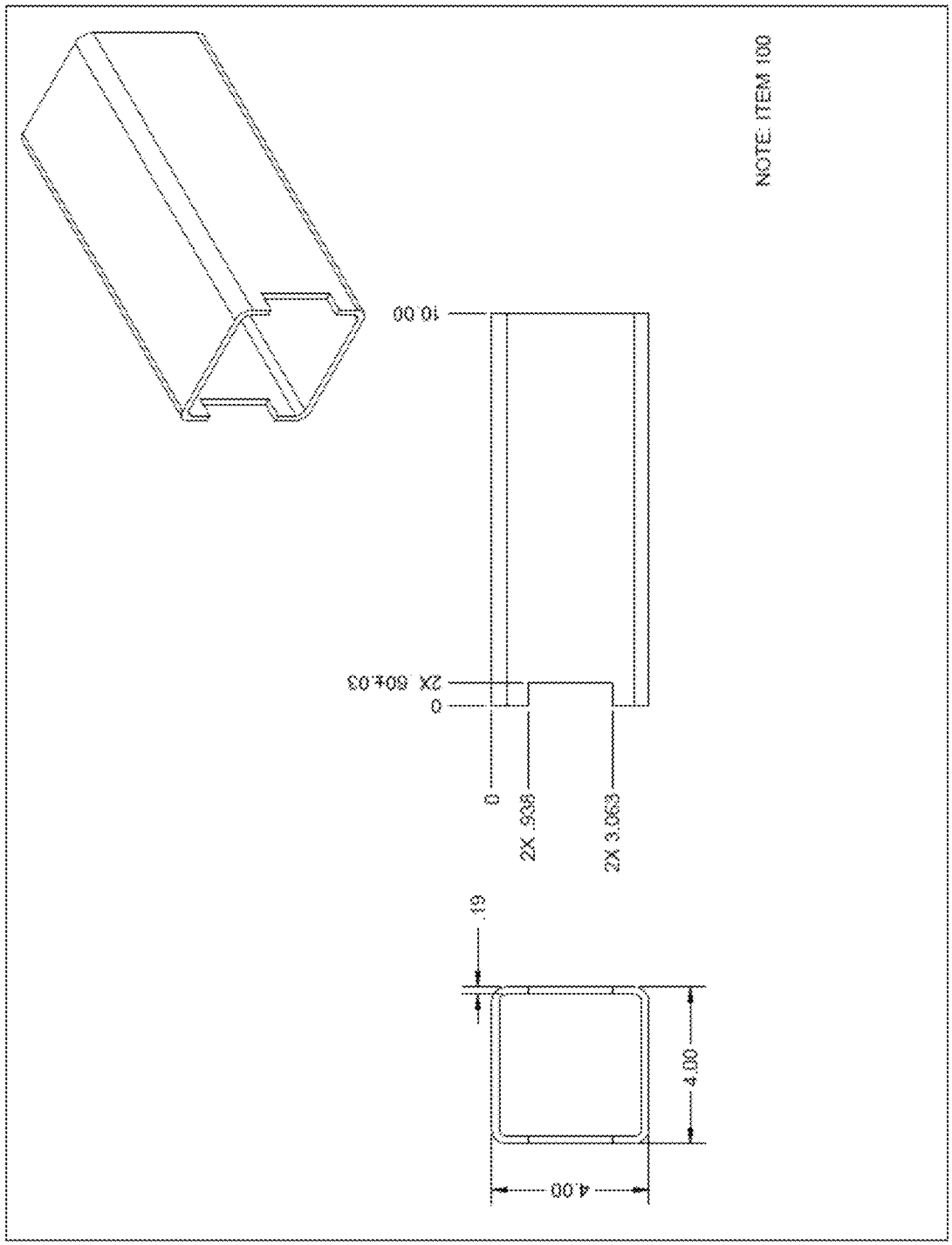
Figure 5D:
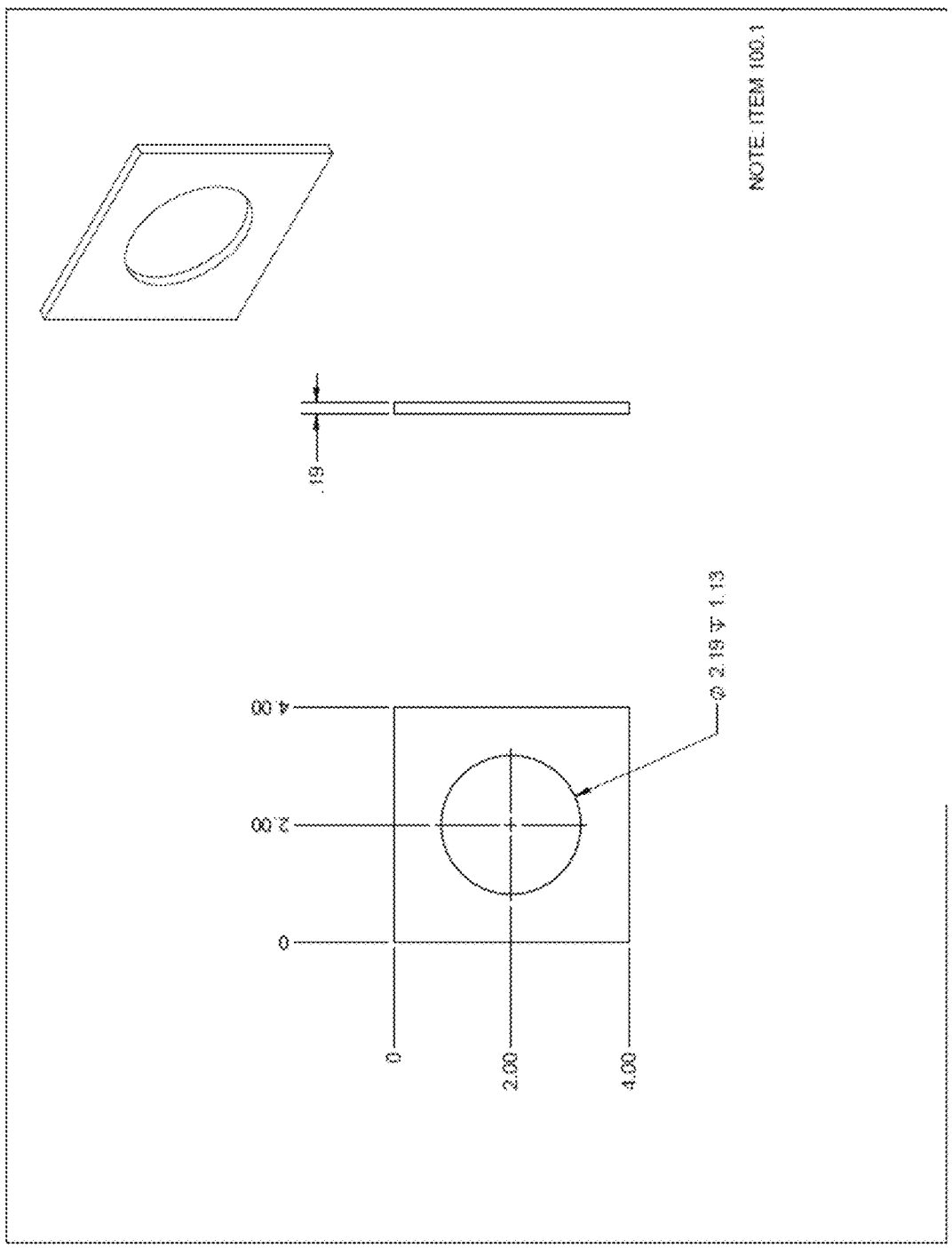
Figure 5E:
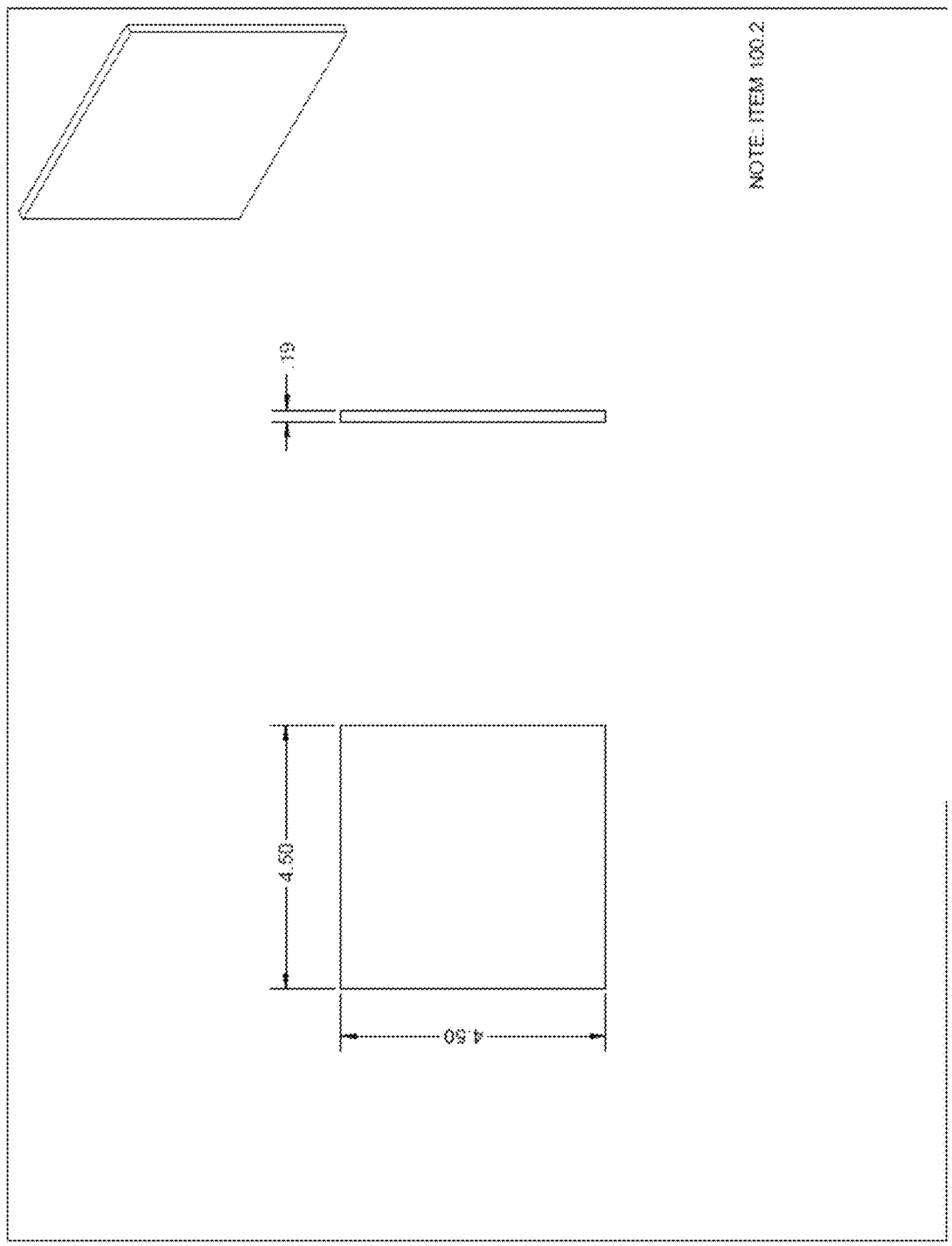
Figure 5F:
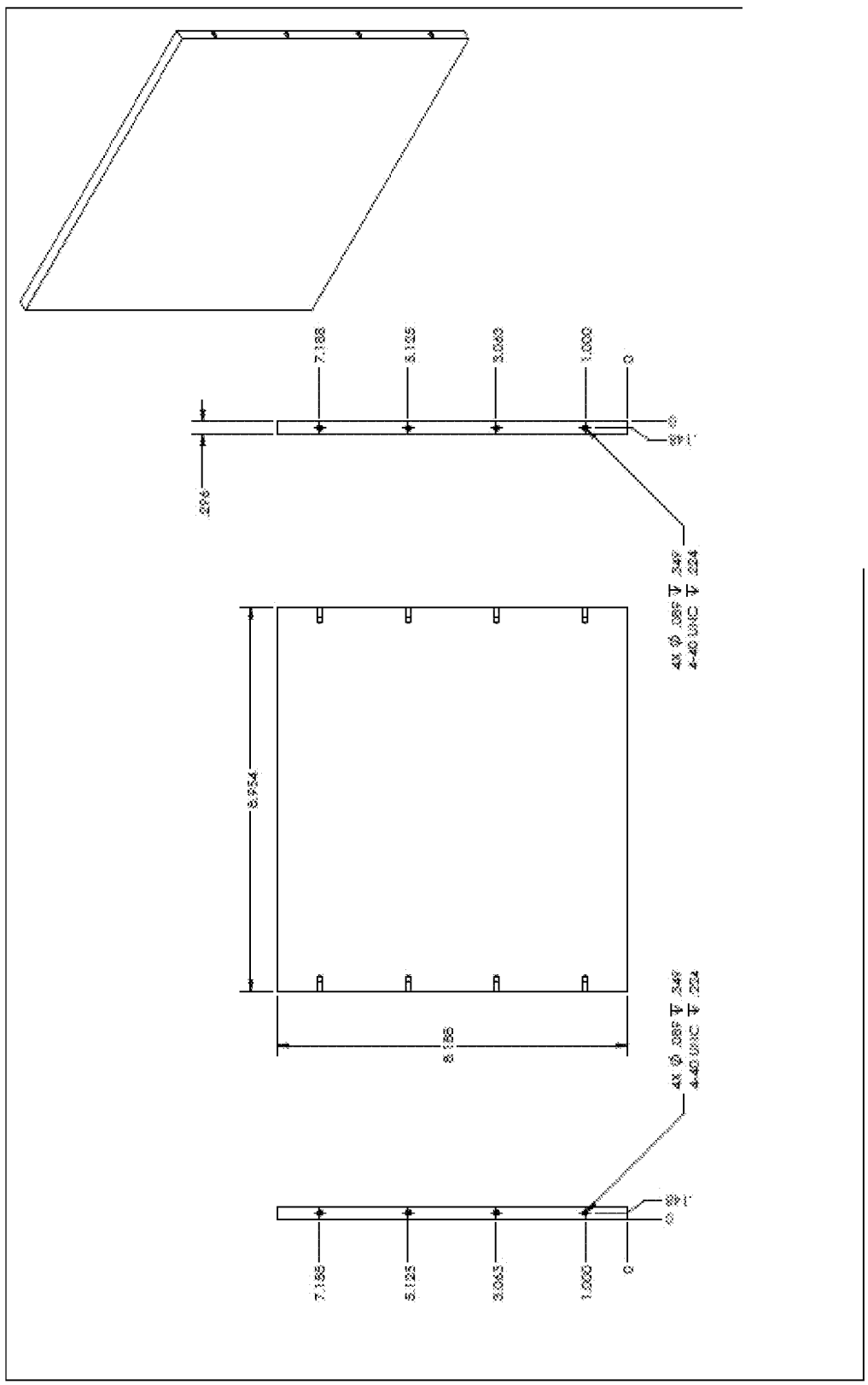
Figure 5G:
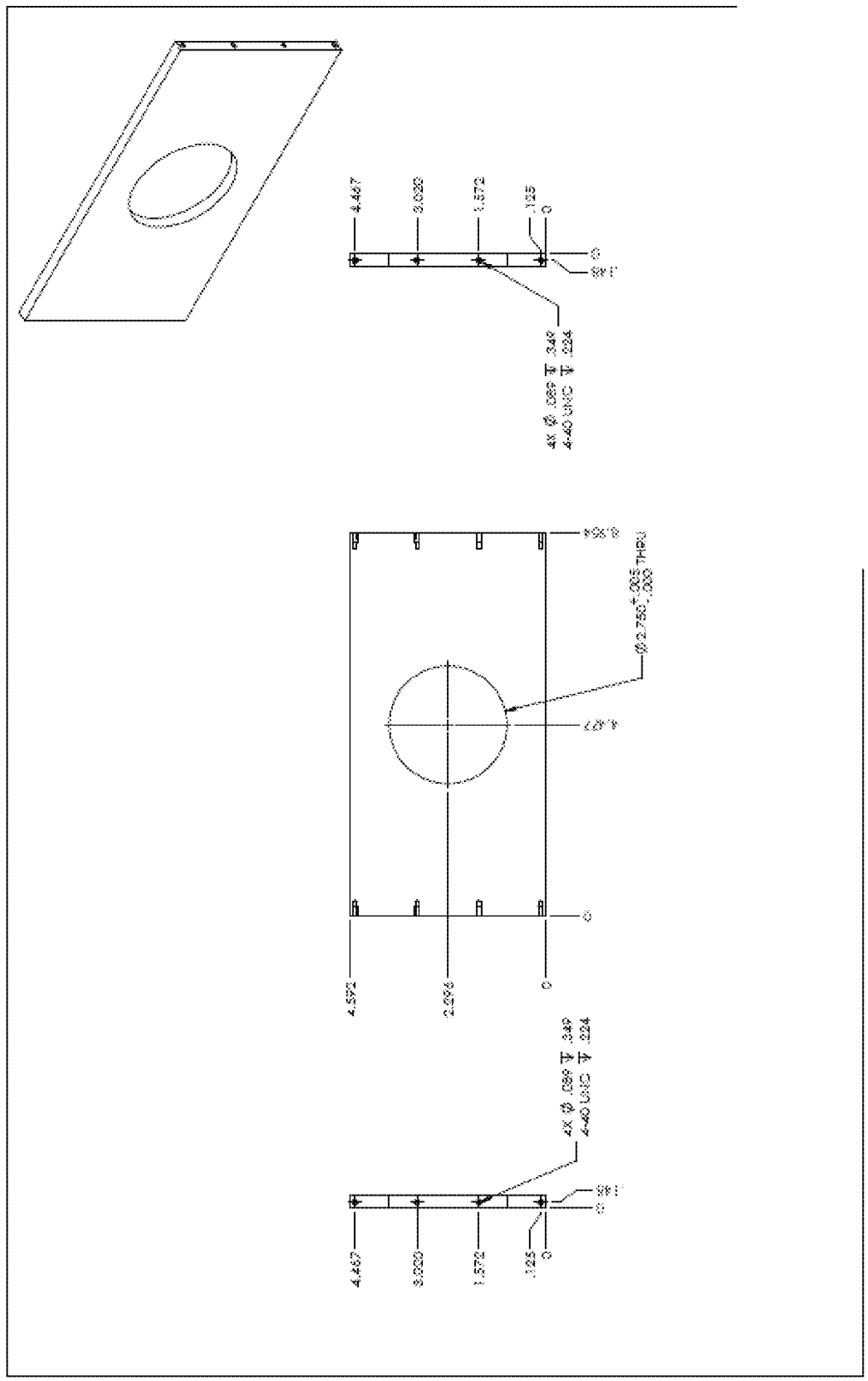
Figure 5H:
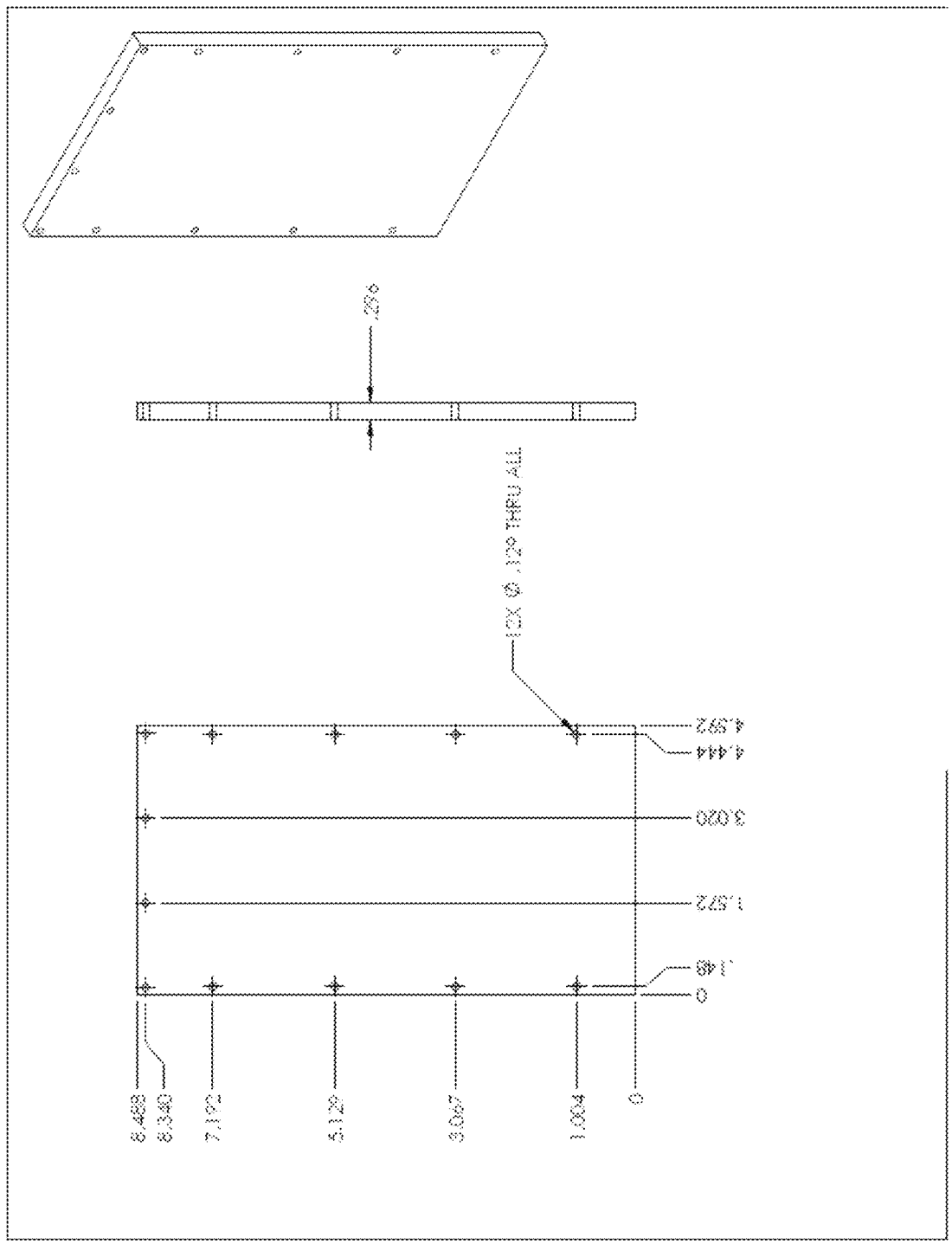
Figure 5I:
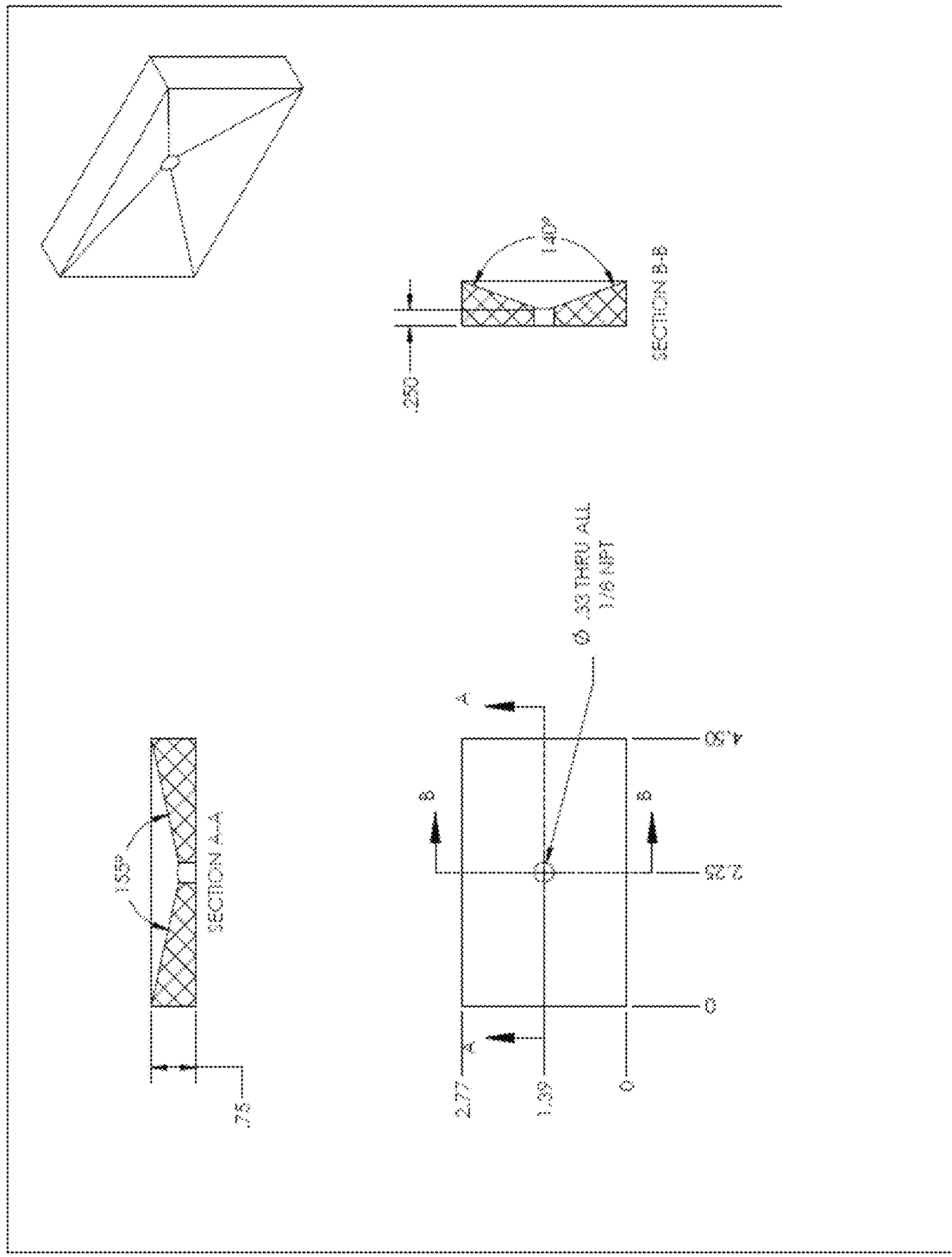

FIGS. 5A-5I show representations of various components of an example water purification device according to various examples. FIG. 5A shows a representation of the water purification device. FIG. 5B shows a representation of a tube of the water purification device of FIG. 5A. FIG. 5C shows a representation of a component of the tube shown in FIG. 5B. FIG. 5D shows a representation of another component of the tube shown in FIG. 5B. FIG. 5E shows a representation of another component of the tube shown in FIG. 5B. FIG. 5F shows a representation of a side wall of the water purification device shown in FIG. 5A. FIG. 5G shows a representation of a top of the water purification device shown in FIG. 5A. FIG. 5H shows a representation of a cover of the water purification device shown in FIG. 5A. FIG. 5I shows a representation of a water exit of the water purification device shown in FIG. 5A.

Figure 6:
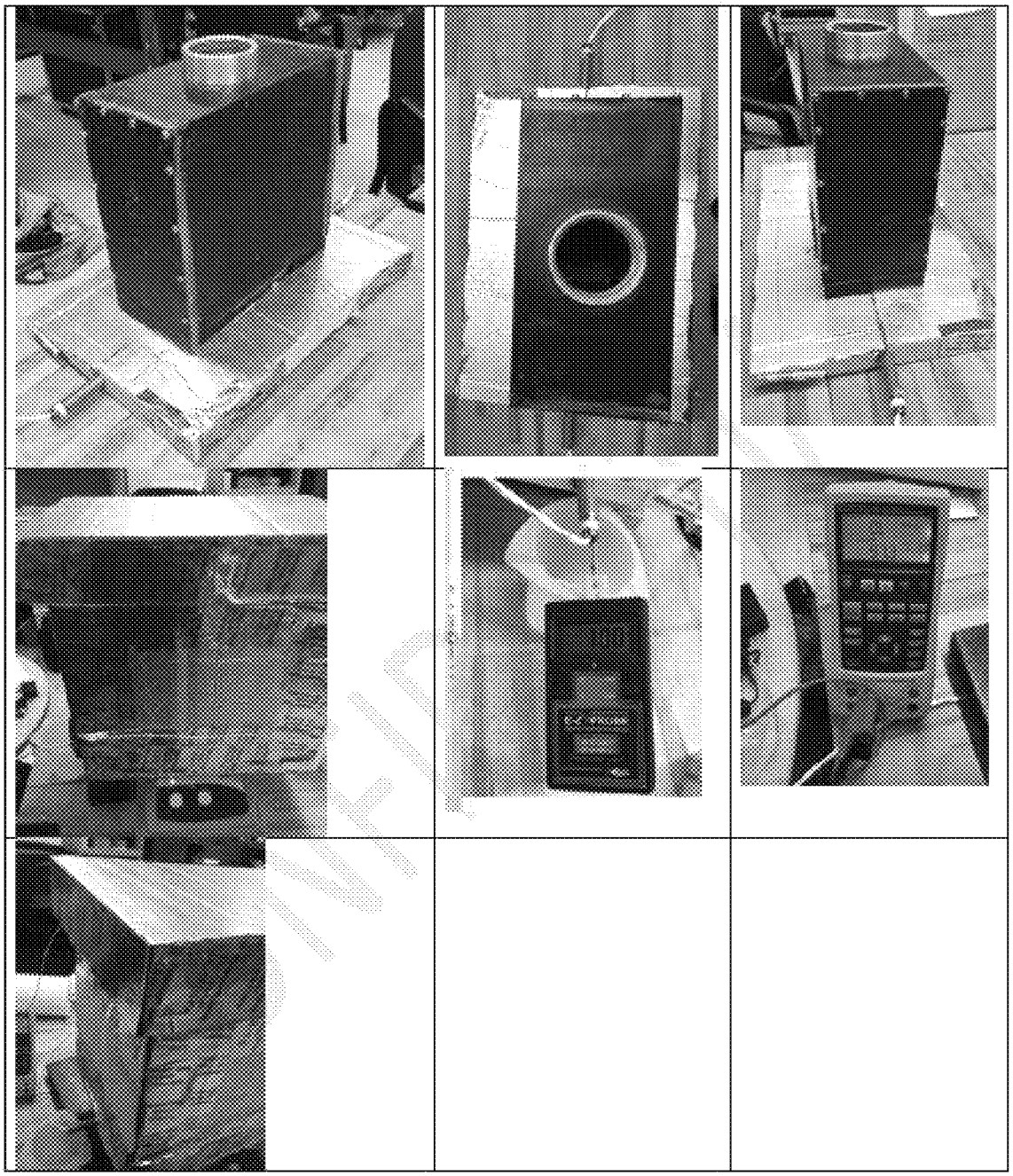
FIG. 6 shows photographs of a representation of an example water purification device according to various examples.

FIG. 6 shows photographs of a representation of an example water purification device according to various examples.

FIG. 7 shows test data related to an example water purification device according to various examples. In particular, FIG. 7 presents data that shows that the efficiency of the water purification device can be about 140.5%.

FIG. 8 shows test data related to another example water purification device according to various examples. In particular, FIG. 8 presents data that shows that the efficiency of the water purification device can be about 152.7%.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The preceding description of the disclosed examples is provided to enable any person skilled in the art to make or use the present examples. Various modifications to these examples will be readily apparent to those skilled in the art, and the generic principles defined herein may be applied to some examples without departing from the spirit or scope of the examples. Thus, the present examples are not intended to be limited to the examples shown herein but is to be accorded the widest scope consistent with the following claims and the principles and novel features disclosed herein.

What is claimed is:

1. A water purification device, comprising:
a heating vessel configured to receive impure water and output at least one of water or water vapor, the heating vessel having an inner surface in contact with the impure water and an outer surface separated from the impure water and opposite the inner surface, the heating vessel comprising:
 a first wall and disposed along a first plane, and
 a second wall contiguous with the first wall and disposed along a second plane, the second plane being separated from the first plane by an angle, the angle being between 135 degrees and 150 degrees, inclusive;
an outer housing configured to receive the at least one of water or water vapor from the heating vessel;
at least one heating element arranged in thermal contact with the outer surface and the at least one of water or water vapor within the outer housing and separated from the impure water by the heating vessel, the at least one heating element configured to provide heat to the impure water through the heating vessel and to provide cooling to the at least one of water or water vapor within the outer housing while providing heat to the impure water through the heating vessel, the at least one heating element comprising:
 a first heating element arranged in thermal contact with the first wall, and
 a second heating element arranged in thermal contact with the second wall;
at least one heat exchanger configured to receive the at least one of water or water vapor from the outer housing and exchange heat between the impure water and the at least one of water or water vapor to raise the temperature of the impure water; and
a brush assembly disposed within the heating vessel, the brush assembly configured to rotate a plurality of brushes within the heating vessel adjacent the inner surface;
wherein the outer surface extends across the first wall and the second wall.

2. The water purification device of claim 1, wherein the at least one heating element includes one or more Peltier cells.

3. The water purification device of claim 2, wherein the at least one heat exchanger exchanges heat between the impure water and a cold side of the one or more Peltier cells.

4. The water purification device of claim 1, wherein:
at least one of the at least one heating element is a Peltier cell; and
the brush assembly is positioned to move along a portion of the inner surface of the heating vessel that is adjacent to a hot side of the Peltier cell.

5. The water purification device of claim 1, further comprising:
at least one screen arranged to obstruct passing at least a portion of an aerosol, and allow to pass at least a portion of the at least one of water or water vapor, to outside of the heating vessel.

6. The water purification device of claim 1, wherein the heating vessel has an octagonal shaped cross-section.

7. The water purification device of claim 1, wherein the heating vessel has a dodecagonal shaped cross-section.

8. The water purification device of claim 1, wherein the at least one heat exchanger includes a first heat exchanger configured to exchange heat between the impure water within the heating vessel and the at least one of water or water vapor.

9. The water purification device of claim 8, wherein the heat exchanged between the impure water within the heating vessel and the at least one of water or water vapor includes heat of condensation of the water vapor.

10. The water purification device of claim 8, wherein the at least one heat exchanger includes a second heat exchanger configured to exchange heat between the impure water before it is received by the heating vessel and the at least one of water or water vapor.

11. The water purification device of claim 1, wherein the heating vessel has a decagonal shaped cross-section.

12. The water purification device of claim 1, wherein the heating vessel has twelve or more sides.

13. The water purification device of claim 1, wherein the heating vessel includes an anti-corrosive coating.

14. The water purification device of claim 1, further comprising a conduit that is configured to receive the impure water and provide the impure water to the heating vessel, the conduit disposed within the heating vessel and disposed between a first brush of the plurality of brushes and a second brush of the plurality of brushes;
wherein the brush assembly is configured to rotate the first brush around the conduit and rotate the second brush around the conduit.

15. The water purification device of claim 14, wherein:
the heating vessel comprises:
 an upper portion; and
 a lower portion contiguous with the upper portion, the lower portion being conical in shape;
the outer surface extends across the upper portion;
at least a first portion of the brush assembly is disposed within the upper portion;
at least a first portion of the conduit is disposed within the upper portion; and
at least a second portion of the conduit is disposed within the lower portion.

16. A water purification device, comprising:
a heating vessel configured to receive impure water and output at least one of water or water vapor, the heating vessel having an inner surface in contact with the impure water and an outer surface separated from the impure water and opposite the inner surface;
an outer housing configured to receive the at least one of water or water vapor from the heating vessel;
at least one heating element arranged in thermal contact with the outer surface and the at least one of water or water vapor within the outer housing and separated from the impure water by the heating vessel, the at least one heating element configured to provide heat to the impure water through the heating vessel and to provide cooling to the at least one of water or water vapor within the outer housing while providing heat to the impure water through the heating vessel;

at least one heat exchanger configured to receive the at least one of water or water vapor from the outer housing and exchange heat between the impure water and the at least one of water or water vapor to raise a temperature of the impure water;

a brush assembly disposed within the heating vessel, the brush assembly configured to rotate a plurality of brushes within the heating vessel adjacent the inner surface; and a conduit that is configured to receive the impure water and provide the impure water to the heating vessel, the conduit disposed within the heating vessel and disposed between a first brush of the plurality of brushes and a second brush of the plurality of brushes;

wherein the brush assembly is configured to rotate the first brush around the conduit and rotate the second brush around the conduit.

17. The water purification device of claim 16, wherein:

the heating vessel comprises:
   an upper portion; and
   a lower portion contiguous with the upper portion, the lower portion being conical in shape;

the outer surface extends across the upper portion;

at least a first portion of the brush assembly is disposed within the upper portion;

at least a first portion of the conduit is disposed within the upper portion; and at least a second portion of the conduit is disposed within the lower portion.

\* \* \* \* \*